(12) United States Patent
Liu

(10) Patent No.: US 12,120,470 B2
(45) Date of Patent: Oct. 15, 2024

(54) PROJECTION SYSTEM AND CALIBRATION METHOD THEREOF

(71) Applicant: DELTA ELECTRONICS, INC., Taoyuan (TW)

(72) Inventor: Kai-Ming Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 62 days.

(21) Appl. No.: 18/173,798

(22) Filed: Feb. 24, 2023

(65) Prior Publication Data

US 2024/0187558 A1 Jun. 6, 2024

(30) Foreign Application Priority Data

Dec. 2, 2022 (CN) .......................... 202211535025.2

(51) Int. Cl.
H04N 9/31 (2006.01)

(52) U.S. Cl.
CPC ......... H04N 9/3182 (2013.01); H04N 9/3194 (2013.01)

(58) Field of Classification Search
CPC ............... H04N 9/3182; H04N 9/3194; G03B 21/2006–206
See application file for complete search history.

(56) References Cited

U.S. PATENT DOCUMENTS

| | | | | |
|---|---|---|---|---|
| 10,798,348 B2 * | 10/2020 | Ikeura | ................... | H04N 9/3158 |
| 2002/0089611 A1 * | 7/2002 | Kim | .......................... | H04N 5/74 348/602 |
| 2007/0091055 A1 * | 4/2007 | Sakuda | ................ | G09G 3/3611 345/102 |
| 2011/0001881 A1 * | 1/2011 | Kawahara | ............ | H04N 9/3191 348/E9.037 |
| 2011/0188002 A1 * | 8/2011 | Park | ........................ | G03B 33/12 353/122 |
| 2011/0316890 A1 * | 12/2011 | Chen | ................... | G03B 21/2013 345/690 |
| 2014/0192331 A1 * | 7/2014 | Toyooka | ............ | G03B 21/2053 353/121 |
| 2017/0208301 A1 * | 7/2017 | Toyooka | ............ | G03B 21/2053 |
| 2023/0092956 A1 * | 3/2023 | Domnits | ............ | G03B 21/2033 353/98 |
| 2024/0040095 A1 * | 2/2024 | Chen | ........................ | H04N 5/58 |

FOREIGN PATENT DOCUMENTS

| | | |
|---|---|---|
| CN | 102193285 A | 9/2011 |
| CN | 102547306 A | 7/2012 |
| CN | 106791737 A | 5/2017 |
| CN | 106324965 B | 6/2018 |
| CN | 110832396 A | 2/2020 |
| TW | I279735 B | 4/2007 |
| TW | 200815900 A | 4/2008 |
| TW | 200951608 A | 12/2009 |
| TW | I758094 B | 3/2022 |

* cited by examiner

Primary Examiner — John W Miller
Assistant Examiner — Humam M Satti
(74) Attorney, Agent, or Firm — CKC & Partners Co., LLC

(57) ABSTRACT

A projection system includes a light source module, an image device, a first light sensor, a second light sensor, and a processor. The light source module has at least one solid-state light-emitting device. The processor is communicatively coupled to the light source module, the first light sensor, and the second light sensor and is configured to execute a calibration procedure.

17 Claims, 3 Drawing Sheets

PROJECTION SYSTEM AND CALIBRATION METHOD THEREOF

CROSS-REFERENCE TO RELATED APPLICATION

This application claims priority to China Application Serial Number CN202211535025.2, filed Dec. 2, 2022, which is herein incorporated by reference.

BACKGROUND

Technical Field

The present disclosure relates to a projection system and a calibration method thereof.

Description of Related Art

Recently, optical projectors have been widely applied in many fields, and the range of their applications is expanding gradually. For example, their applications extend from laser projection TVs to projectors used in flight simulators. Various optical projectors are widely used in schools, households, and business occasions.

Lasers are a type of solid-state light source. Taking laser projectors as an example, automatic white balance calibration of laser projectors solves the white balance shift problem induced by different attenuation rates between blue laser diodes and yellow phosphors (as well as red laser diodes) over time. Among various automatic white balance calibration methods, external calibration is a method of using sensing values of external light sensors at the maximum output power of the laser as a white balance target, to improve the calibration accuracy. However, standard meters and related tools for external light sensors are not readily available to typical end users.

Accordingly, how to provide a projection system and a calibration method thereof to solve the aforementioned problems becomes an important issue to be solved by those in the industry.

SUMMARY

An aspect of the disclosure is to provide a projection system and a calibration method thereof that may efficiently solve the aforementioned problems.

According to an embodiment of the disclosure, a projection system includes a light source module, an image device, a first light sensor, a second light sensor, and a processor. The light source module has at least one solid-state light-emitting device. The processor is communicatively coupled to the light source module, the first light sensor, and the second light sensor. The processor is configured to execute a calibration procedure. The calibration procedure includes: driving the at least one solid-state light-emitting device to generate output powers according to light source control signals, to sequentially emit white lights, and to sequentially project full white patterns on a screen through the image device; driving the first light sensor to sequentially sense the white lights and correspondingly generate a first color information; driving the second light sensor to sequentially sense the full white patterns and correspondingly generate a second color information; obtaining a corresponding relationship between the first color information and the second color information; obtaining a target color information of the second color information according to a color space coordinate in the second color information; obtaining a target color information of the first color information according to the target color information of the second color information and the corresponding relationship; and calibrating the light source control signals corresponding to the output powers according to the target color information of the first color information.

In an embodiment of the disclosure, the color space coordinate in the second color information is a color space coordinate of the full white pattern generated by the at least one solid-state light-emitting device with the highest one of the output powers.

In an embodiment of the disclosure, the first color information includes color space coordinates sensed by the first light sensor when the at least one solid-state light-emitting device emits the white lights with the output powers.

In an embodiment of the disclosure, the second color information includes color space coordinates sensed by the second light sensor when the at least one solid-state light-emitting device projects the full white patterns with the output powers.

In an embodiment of the disclosure, the projection system further includes an accumulated light box disposed on the paths of the white lights. The accumulated light box has an entrance. The white lights enter the accumulated light box through the entrance and mix uniformly in the accumulated light box. The first light sensor is disposed on the accumulated light box.

In an embodiment of the disclosure, the accumulated light box further includes a mirror. The mirror is configured to allow a first part of light of each of the white lights to pass through and to divert a second part of light of each of the white lights. The first light sensor is configured to receive one of the first part of light and the second part of light. The image device is configured to receive another of the first part of light and the second part of light.

In an embodiment of the disclosure, the projection system further includes an optical fiber. The light source module and the image device are respectively disposed at two ends of the optical fiber by means of optical coupling.

In an embodiment of the disclosure, the projection system further includes a housing. The light source module and the image device are disposed in the housing. The image device includes a light processing module and a projector lens.

In an embodiment of the disclosure, the second light sensor is a charge couple device camera or a complementary metal oxide semiconductor.

In an embodiment of the disclosure, the projection system further includes an input device and a display device. The input device is communicatively coupled to the processor. The input device is configured to receive a calibration input. The processor is configured to execute the calibration procedure according to the calibration input. The display device is communicatively coupled to the processor and is configured to display an execution result of the calibration procedure.

According to another embodiment of the disclosure, a calibration method of a projection system includes: driving at least one solid-state light-emitting device to generate output powers according to light source control signals, to sequentially emit white lights, and to sequentially project full white patterns on a screen through an image device; driving a first light sensor to sequentially sense the white lights and correspondingly generate a first color information; driving a second light sensor to sequentially sense the full white patterns and correspondingly generate a second color information; obtaining a corresponding relationship between the first color information and the second color information; obtaining a target color information of the second color information according to a color space coordinate in the second color information; obtaining a target color information of the first color information according to the target color information of the second color information and the corresponding relationship; and calibrating the light source control signals corresponding to the output powers according to the target color information of the first color information.

In an embodiment of the disclosure, the obtaining the target color information of the second color information according to the color space coordinate in the second color information is according to a color space coordinate of the full white pattern generated by the at least one solid-state light-emitting device with the highest one of the output powers.

In an embodiment of the disclosure, the first color information includes color space coordinates sensed by the first light sensor when the at least one solid-state light-emitting device emits the white lights with the output powers.

In an embodiment of the disclosure, the second color information includes color space coordinates sensed by the second light sensor when the at least one solid-state light-emitting device projects the full white patterns with the output powers.

In an embodiment of the disclosure, the corresponding relationship between the first color information and the second color information is a straight-line relationship or an Nth-order polynomial relationship.

In an embodiment of the disclosure, each of the first color information and the second color information includes color space coordinates.

In an embodiment of the disclosure, the light source control signals include current signals input to the at least one solid-state light-emitting device.

Accordingly, in the projection system and the method of calibrating the projection system in the present disclosure, by disposing an external light sensor, i.e. the so-called standard meter, in the projection system as a second light sensor, there is no need for end users to purchase an additional standard meter and related tools for external calibration. In addition, a processor is configured to drive the second light sensor and an originally in-built first light sensor to perform data sampling respectively. Then, the processor obtains a calibration target of light source control signals with a pre-written algorithm therein. Finally, the processor automatically adjusts the light source control signals input to the solid-state light-emitting device and completes the automatic white balance calibration. Such calibration procedure can be conveniently selected through a function menu of the projection systems when the projection systems are being set up or when a production test is being conducted. Therefore, compared to the commonly used projection systems and their calibration methods, the projection system and the calibration method in this disclosure can simplify the equipment and operation steps included in the calibration procedure, especially in view of automatic white balance calibration, and further improve the ease of use during test and validation of the projection system for end users or factories.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
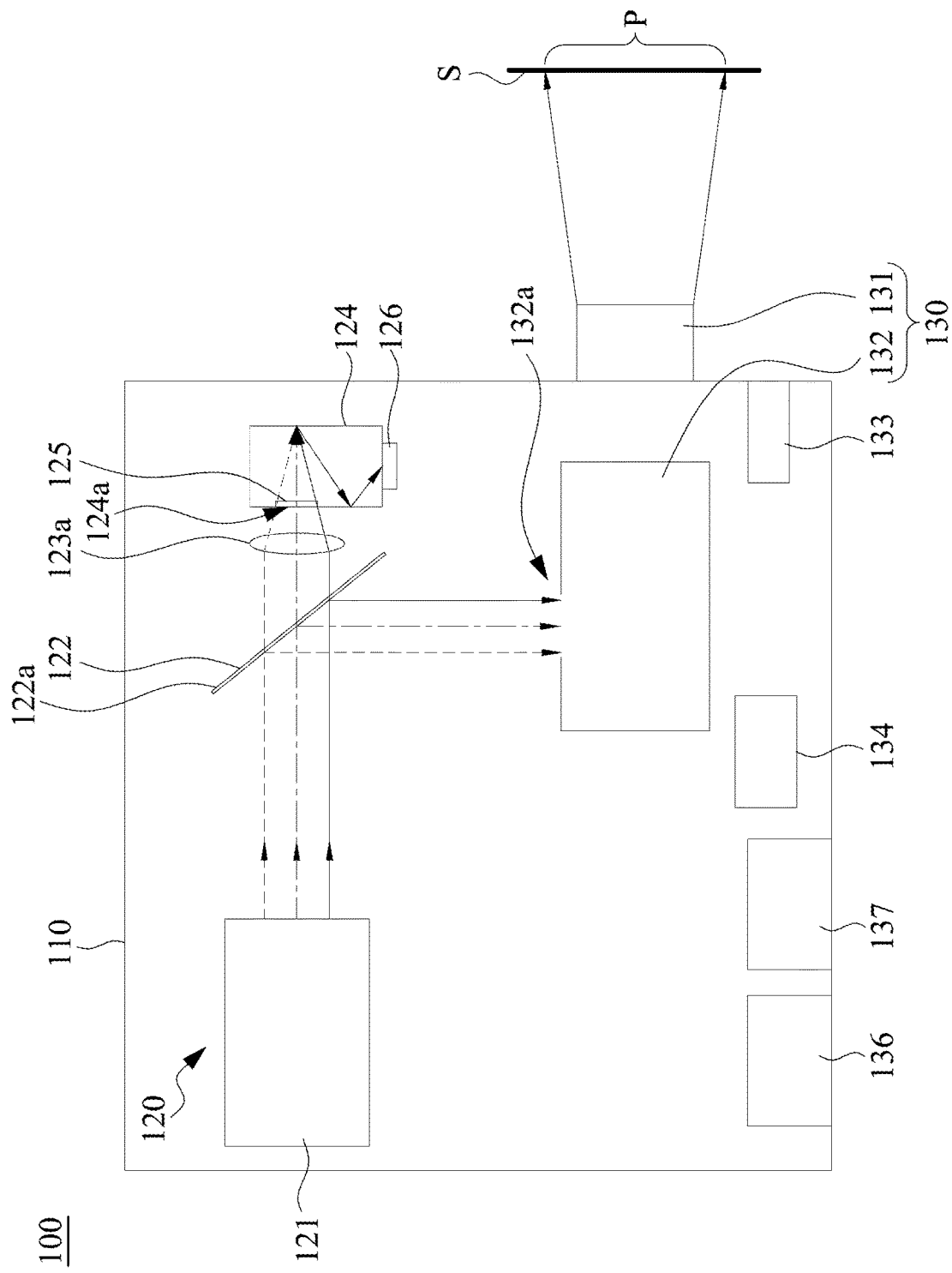
FIG. 1 is a perspective view of a projection system according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of a projection system 100 according to an embodiment of the present disclosure. As shown in FIG. 1, the projection system 100 includes a light source module 120, an accumulated light box 124, an image device 130, a first light sensor 126, and a second light sensor 133.

The light source module 120 includes at least one solid-state light-emitting device 121 for generating white lights. For example, the solid-state light-emitting device 121 may be laser diodes, organic laser diodes (OLD), or similar light-emitting devices. To be more specific, the solid-state light-emitting device 121 may use blue laser diodes to excite phosphors to produce chromatic lights and may mix the chromatic lights to generate white lights. It may also be possible to use a plurality of laser diodes to simultaneously generate different chromatic lights and mix the chromatic lights to generate white lights. For example, applying three laser diodes with different primary colors, such as red, green, and blue, or red, yellow, and blue. Yellow phosphor may be employed to emit yellow light.

As shown in FIG. 1, the mirror 122 is disposed on paths of the white light emitted by the solid-state light-emitting device 121. The mirror 122 may transmit a first part of light and reflect a second part of light. Therefore, the mirror 122 allows the first part of light to pass through and diverts the second part of light. The first part of light enters the accumulated light box 124 through the entrance 124a of the accumulated light box 124 and the diffuser 125.

The accumulated light box 124 may be an integral sphere box or a similar light uniformizing device. An integral sphere box, for example, includes mirrors that uniformize the light by reflections. With such optical path configuration, the accumulated light box 124 may be disposed at a position where it may not be affected by reflections of the second part of light. Meanwhile, the first light sensor 126 is disposed on the accumulated light box 124. Hence, the accuracy of the light sensing values of the first light sensor 126 sensing the first part of light may be further improved. Accordingly, the white balance calibration according to the light sensing values may also have enhanced accuracy.

More particularly, in the embodiment corresponding to FIG. 1, the projection system 100 further includes a relay mirror 123a. The relay mirror 123a is disposed between the mirror 122 and the entrance 124a of the accumulated light box 124. The relay mirror 123a focuses the first part of light passing through the mirror 122 into the accumulated light box 124. After the first part of light is uniformized by the accumulated light box 124, the first part of light is received by the first light sensor 126. Also, the second part of light enters the image device 130 through the entrance 132a after being diverted by the mirror 122. The image device 130 is configured to collect the second part of light and make an image through the light processing module 132 and the projector lens 131 therein. The image is projected to a predetermined position outside the projection system 100 (such as the screen S shown in FIG. 1 or other items).

The light source module 120, the mirror 122, the accumulated light box 124, the second light sensor 133, and the processor 134 are disposed in the first housing 110. The image device 130 is at least partially disposed in the first housing 110. However, the present disclosure is not intended to limit to this configuration.

In some embodiments, the second light sensor 133 may be a charge-coupled device (CCD) camera or a complementary metal oxide semiconductor (CMOS). In some embodiments, the second light sensor 133 may be disposed outside the first housing 110.

The image device 130 includes a projector lens 131 exposed through the first housing 110 and a light processing module 132 disposed in the first housing 110. The light processing module 132 is configured to effectively divert the second part of light incident into the image device 130 to the projector chip (not shown). After the second part of light is reflected through the projector chip, a full white pattern P is projected. The projector lens 131 is configured to project the full white pattern P onto the screen S or other items.

In the embodiment corresponding to FIG. 1, the reflecting plane 122a of the mirror 122 is provided with a coating with high reflectivity. More specifically, the reflectivity of the reflecting plane 122a is such that the first part of light passing through the mirror 122 accounts for approximately 1% of the white light emitted by the solid-state light-emitting device 121 (i.e. the second part of light reflected by the mirror 122 accounts for approximately 99% of the white light emitted by the solid-state light-emitting device 121). However, the present disclosure is not intended to limit the inventions to the specific embodiments.

In some other embodiments, if the reflectivity of the mirror 122 makes the ratio of the second part of light to the overall white light smaller than that of the first part of light to the overall white light, then the configuration of the components and the optical path is changed. The adjustment is such that the second part of light diverts to the accumulated light box 124, and the first part of light enters the image device 130 after being transmitted by the mirror 122 (not shown in the drawings). In such embodiment, the image device 130 is configured to receive the first part of light.

Figure 2:
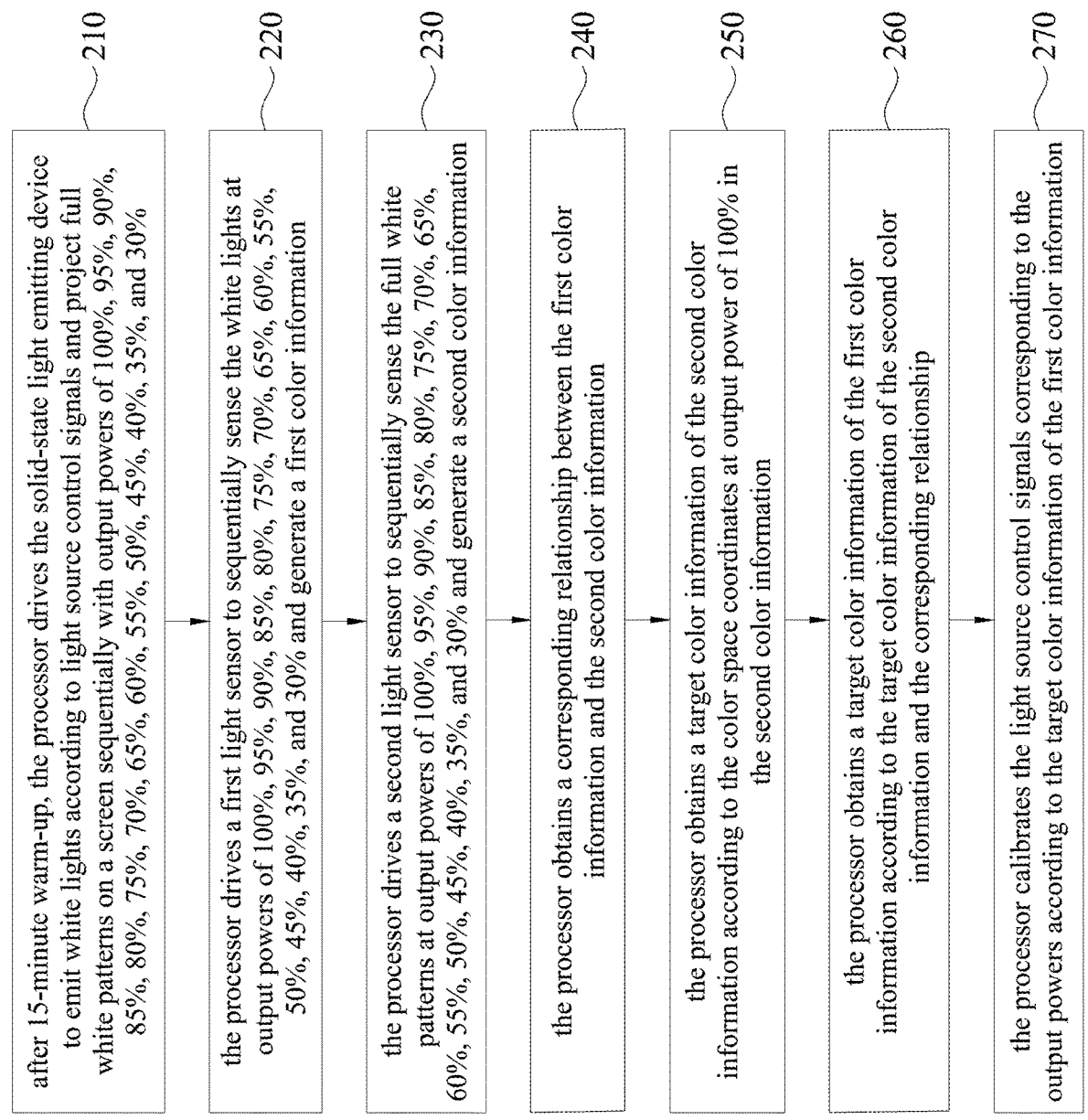
FIG. 2 is a flow diagram of a calibration method of a projection system according to an embodiment of the present disclosure.

To obtain external projection information for automatic white balance calibration, the projection system 100 includes a processor 134. The processor 134 is communicatively coupled to the light source module 120, the first light sensor 126, and the second light sensor 133. The processor 134 may transmit different light source control signals to the light source module 120 to adjust the white lights emitted by the solid-state light-emitting device 121. The processor may also obtain the light sensing values from the first light sensor 126 and the second light sensor 133. The operations of the method 200 of calibrating the projection system 100 are shown in FIG. 2. FIG. 2 is a flow diagram of the method 200 of calibrating the projection system 100 according to an embodiment of the present disclosure.

The method 200 begins with the operation 210, the operation 220, and the operation 230. First, determine the output powers for sampling the light sensing values, for example, 100%, 95%, 90%, 85%, 80%, 75%, 70%, 65%, 60%, 55%, 50%, 45%, 40%, 35%, and 30%. Then, after the projection system 100 has undergone a warm-up procedure for at least fifteen minutes, the processor 134 transmits a light source control signal corresponding to 100% output power to the light source module 120. In turn, the processor 134 drives the solid-state light-emitting device 121 to emit a white light at 100% output power. The second part of light of the white light passes through the light processing module 132 and the projector lens 131 to project a full white pattern P on a predetermined position outside the projection system 100 (such as the screen S shown in FIG. 1 or an object). Next, the first light sensor 126 is driven by the processor 134 to sense the first part of light transmitted through the mirror 122 to generate a first color information corresponding to 100% output power. Finally, the processor 134 drives the second light sensor 133 to sense the full white pattern P projected on the predetermined position and to generate a second color information corresponding to 100% output power.

Then, the processor 134 sequentially transmits light source control signals corresponding to output powers of 95%, 90%, 85%, 80%, 75%, 70%, 65%, 60%, 55%, 50%, 45%, 40%, 35%, and 30% to drive the solid-state light-emitting device 121 to emit white lights with output powers of 95%, 90%, 85%, 80%, 75%, 70%, 65%, 60%, 55% %, 50%, 45%, 40%, 35%, and 30%. In turn, the first light sensor 126 and the second light sensor 133 generate the corresponding first color information and the corresponding second color information with output powers of 95%, 90%, 85%, 80%, 75%, 70%, 65%, 60%, 55%, 50%, 45%, 40%, 35%, and 30%. In such embodiment, the first color information and the second color information are obtained in the form of an XYZ color space, where X, Y, and Z are the coordinates of the primary colors. The coordinates represent the intensities of different chromatic lights received by the sensors. The X coordinate represents red light. The Y coordinate represents green light. The Z coordinate represents blue light. As such, when the operation 210, the operation 220, and the operation 230 are completed, the solid-state light-emitting device 121 emits a total of fifteen white lights and projects a total of fifteen full white patterns P (referring to in FIG. 1) with output powers of 100%, 95%, 90%, 85%, 80%, 75%, 70%, 65%, 60%, 55%, 50%, 45%, 40%, 35%, and 30%. Consequently, the first color information includes fifteen color space coordinates of fifteen white lights measured by the first light sensor 126. The second color information includes fifteen color space coordinates of the full white patterns P (referring to FIG. 1) measured by the second light sensor 133. In some embodiments, the first color information and the second color information may also be obtained in the form of RGB color space.

As aforementioned, the processor 134 may adjust the white lights emitted by the solid-state light-emitting device 121 by transmitting different light source control signals. In general, the light sensing values of the first light sensor 126 sensing the first part of light may be estimated from the light source control signals according to a specific corresponding relationship. In addition, the corresponding relationship may vary with the condition of the equipment (such as the reflectivity of the mirror 122). These corresponding relationships are recorded in the processor 134.

Similarly, under the same circumstances, a corresponding relationship between the light sensing values obtained by the second light sensor 133 and the light sensing values obtained by the first light sensor 126 may be determined. However, since the circumstances may vary greatly, in the method 200 of the present disclosure, the processor 134 determines the corresponding relationship according to the data obtained on site at the time the calibration procedure is executed.

For example, as shown in FIG. 2, the operation 240 included in the method 200 is to perform a 1st-order linear regression analysis according to the fifteen color space coordinates of the first color information and the fifteen color space coordinates of the second color information obtained in the operation 220 and the operation 230. Based on the analysis, a straight-line relationship of the color space coordinates may be obtained. For example, in such embodiment, the operation 240 obtains a straight-line relationship between the X coordinates of the first color information and the X coordinates of the second color information. Also, the operation 240 obtains a straight-line relationship between the Y coordinates of the first color information and the Y coordinates of the second color information. Similarly, the operation 240 obtains a straight-line relationship between the Z coordinates of the first color information and the Z coordinates of the second color information. As such, there are a total of three relationships obtained. It should be understood that those skilled in the art may choose different analyses to obtain corresponding relationships according to the trend and correlation of the sampled data, such as Nth-order polynomial regression, without departing from the scope of the present disclosure.

Next, the method 200 includes the operation 250. In the operation 250, part of the data from the second color information is chosen to be a reference. For example, in an embodiment, the color space coordinate $(X_{100}, Y_{100}, Z_{100})$ of the full white pattern P (referring to FIG. 1) measured by the second light sensor 133 with 100% output power is used as a reference to calculate the chromaticity coordinate, which is expressed as $(x_{100}, y_{100})$. The conversion between chromaticity coordinates $(x, y)$ and color space coordinates $(X, Y, Z)$ is shown in the following equations (1) and (2).

$$x = \frac{X}{X+Y+Z} \qquad \text{equation (1)}$$

$$y = \frac{Y}{X+Y+Z} \qquad \text{equation (2)}$$

Then, the embodiment aims at obtaining a target color information of the second color information that keeps the chromaticity coordinates of the full white patterns projected with different output powers the same as the chromaticity coordinate of the full white pattern P projected with 100% output power. To be more specific, when the chromaticity coordinates at different output powers are equal to $(x_{100}, y_{100})$, the ratio is fixed between the color space coordinate X, Y, and Z with each output power and the color space coordinate $X_{100}$, $Y_{100}$, and $Z_{100}$ where the output power is 100%. Take A % output power as an example. Under the condition where the chromaticity coordinate is equal to $(X_{100}, y_{100})$ when the output power is A %, the proportional relationship of the light sensing values $(X_A, Y_A, Z_A)$ and $(X_{100}, Y_{100}, Z_{100})$ is shown in the equation (3).

$$\frac{X_A}{X_{100}} = \frac{Y_A}{Y_{100}} = \frac{Z_A}{Z_{100}} \qquad \text{equation (3)}$$

As such, given the values of $X_{100}$, $Y_{100}$, and $Z_{100}$ and any of the values of $X_A$, $Y_A$, and $Z_A$, the values of the other two can be obtained. For example, in the operation 230, the second color information of the uncalibrated solid-state light-emitting device 121 with 50% output power is $(X_{50}, Y_{50}, Z_{50})$. In this case, if the light sensing value of $Y_{50}$ is retained, i.e., specify $Y_A$ to be $Y_{50}$, then the values of $X_A$ and $Z_A$ can be obtained according to the ratio of $Y_{50}$ and $Y_{100}$. Accordingly, the value of $X_A$ is the target value $X_{50}'$ of $X_{50}$, and the value of $Z_A$ is the target value $Z_{50}'$ of $Z_{50}$. The obtained target color space coordinate $(X_{50}', Y_{50}', Z_{50}')$ is such that the full white pattern P with such color space coordinate has the same chromaticity coordinate as the full white pattern P with 100% output power. Therefore, when the operation 250 is completed, fifteen target color space coordinates are obtained for the fifteen output powers. As such, the full white patterns P projected with fifteen different output powers having the corresponding target color space coordinate may have the same chromaticity coordinate. The fifteen target color space coordinates constitute the target color information of the second color information.

In some embodiments, the reference chromaticity coordinate is not limited to that obtained from the second color information. For example, according to the chromaticity coordinate (0.3127, 0.3290) of reference white, the value of $Y_{100}$ in the operation 230 is retained. Then, the target value $X_{100}'$ of $X_{100}$ and the target value $Z_{100}'$ of $Z_{100}$ may be deduced. Similarly, the target values of the light sensing values with other output powers may be obtained. The obtained fifteen target color space coordinates may constitute the target color information of the second color information as well.

The method 200 includes the operation 260. In the operation 260, the fifteen target color space coordinates in the target color information are substituted into the corresponding relationship obtained in the operation 240. For example, the fifteen target color space coordinates are substituted into a straight-line regression relationship. Then, another fifteen color space coordinates are obtained correspondingly. To achieve the goal of keeping the chromaticity coordinates of the projected full white patterns P the same with output powers of 100%, 95%, 90%, 85%, 80%, 75%, 70%, 65%, 60%, 55%, 50%, 45%, 40%, 35%, and 30%, the solid-state light-emitting device 121 is calibrated so that the first light sensor 126 may sense the fifteen color space coordinates obtained in the operation 260 with the fifteen output powers from the fifteen emitted white lights. The fifteen color space coordinates obtained in the operation 260 constitute the target color information of the first color information.

As aforementioned, the corresponding relationship between the first color information and the light source control signals for controlling the solid-state light-emitting device 121 is preset in the processor 134. Therefore, in the operation 270 of the method 200, the light source control signals are obtained through the corresponding relationship such that the first color information of the white lights sensed by the first light sensor 126 is the target color information of the first color information. In some embodiments, the light source control signals include different forms, such as current values for driving the three-color laser diodes. However, the present disclosure is not intended to limit to the specific embodiments.

Figure 3:
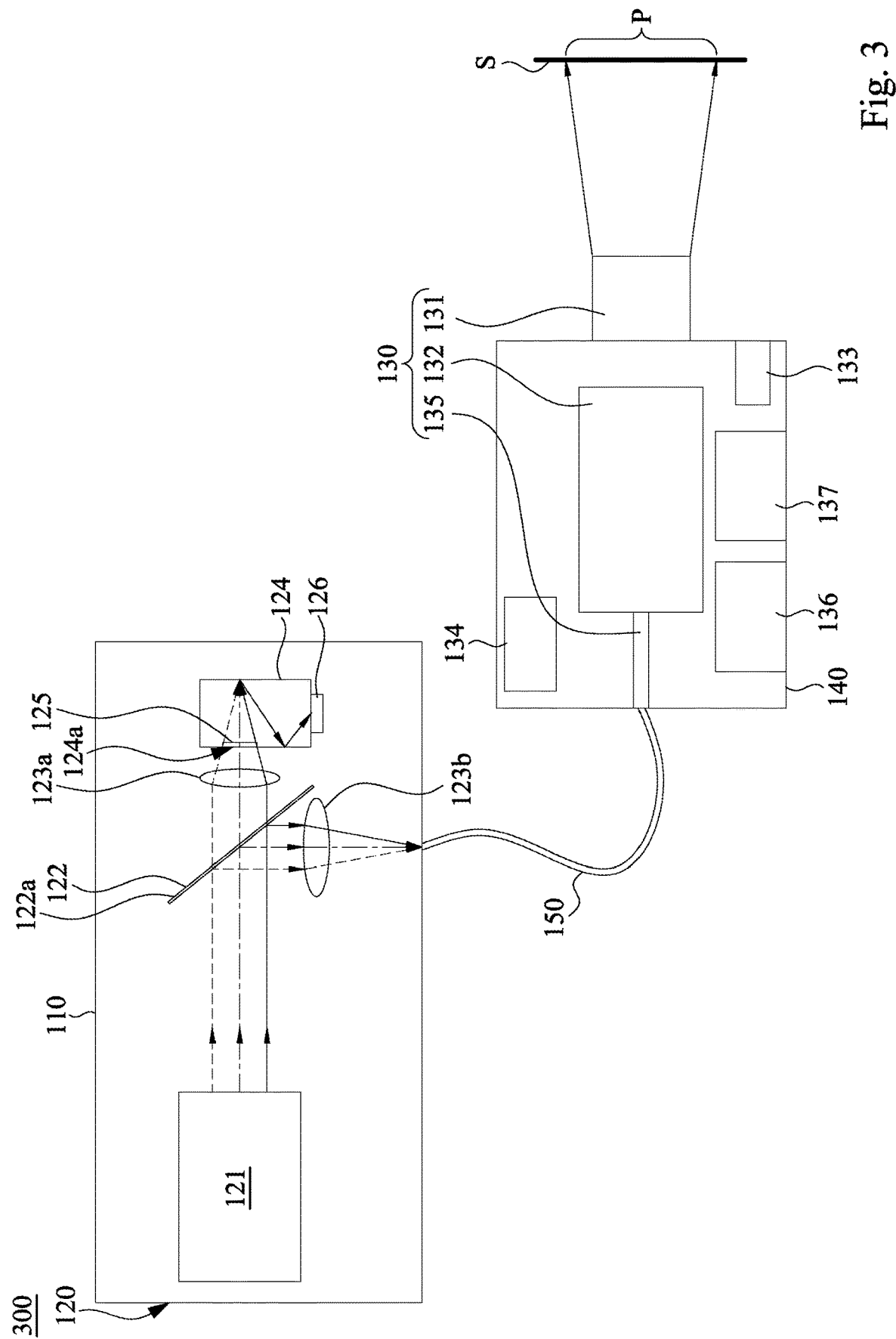
FIG. 3 is a perspective view of a projection system according to another embodiment of the present disclosure.

Reference is made to FIG. 3. FIG. 3 is a perspective view of a projection system 300 according to another embodiment of the present disclosure. As shown in FIG. 3, the projection system 300 includes a first housing 110 and a second housing 140. The first housing 110 and the second housing 140 are separated. The light source module 120, the mirror 122, the relay mirror 123a, the accumulated light box 124, and the first light sensor 126 are disposed in the first housing 110. In some embodiments, the second light sensor 133 is disposed in the second housing 140. In some other embodiments, the second light sensor 133 is disposed outside the second housing 140. The processor 134 is disposed in the second housing 140. The image device 130 is at least partially disposed in the second housing 140. The image device 130 includes a projector lens 131 exposed outside the second housing 140 and a light processing module 132 disposed in the second housing 140.

As shown in FIG. 3, the light source module 120 includes a solid-state light-emitting device 121. The accumulated light box 124 includes a diffuser 125. The first light sensor 126 is disposed on the accumulated light box 124. The image device 130 includes a light processing module 132 and a projector lens 131. The configuration of these components and the method of calibrating the projection system 300 are the same as or similar to those disclosed in the embodiments shown in FIG. 1 and FIG. 2. Therefore, details are not repeated here.

In particular, the difference between the embodiment corresponding to FIG. 3 and the embodiment corresponding to FIG. 1 lies in that the projection system 300 changes the means of optical coupling between the light source module 120 and the image device 130. To be more specific, in the embodiment corresponding to FIG. 3, the projection system 300 further includes an optical fiber 150. The first housing 110 further includes a relay mirror 123b. The image device 130 further includes an integrating rod 135. The light source module 120 is optically coupled to one end of the optical fiber 150. The image device 130 is optically coupled to the other end of the optical fiber 150 via the integrating rod 135. In other words, the second part of light is focused by the relay mirror 123b after being reflected by the mirror 122. Then, the second part of light enters the optical fiber 150 from one end and reaches the integrating rod 135 of the image device 130 through the other end. With such configuration, the flexibility of the projection system 300 in optical path design may be effectively increased.

In this disclosure, the projection system 100 or the projection system 300 applying the method 200 may complete automatic white balance calibration with the implementation of the processor 134. Therefore, in some embodiments, the projection system 100 or the projection system 300 further includes an input device 136 and a display device 137. The input device 136 and the display device 137 are communicatively coupled to the processor 134. The input device 136 is configured to receive a calibration input related to automatic white balance calibration from a user through a function menu of a user interface. The processor 134 is configured to execute a calibration procedure (e.g., the method 200) according to the calibration input. After the calibration procedure is executed, the display device 137 displays the execution result of the calibration procedure. For example, the input device 136 may be a keyboard. The display device 137 may be a display screen. The input device 136 and the display device 137 may be integrated into a touch display module as well. The user may start the automatic white balance calibration with a single key through the input device 136. Then, the display device 137 displays the execution result of the calibration procedure or error message after the calibration is completed or stopped due to an error. As such, the user may directly operate on the projection system 100 or the projection system 300 without connecting them to other devices additionally.

According to the foregoing recitations of the embodiments of the disclosure, it may be seen that in the projection system and the method of calibrating the projection system in the present disclosure, by disposing an external light sensor, i.e. the so-called standard meter, in the projection system as a second light sensor, there is no need for end users to purchase an additional standard meter and related tools for external calibration. In addition, a processor is configured to drive the second light sensor and an originally in-built first light sensor to perform data sampling respectively. Then, the processor obtains a calibration target of light source control signals with a pre-written algorithm therein. Finally, the processor automatically adjusts the light source control signals input to the solid-state light-emitting device and completes the automatic white balance calibration. Such calibration procedure can be conveniently selected through a function menu of the projection systems when the projection systems are being set up or when a production test is being conducted. Therefore, compared to the commonly used projection systems and their calibration methods, the projection system and the calibration method in this disclosure can simplify the equipment and operation steps included in the calibration procedure, especially in view of automatic white balance calibration, and further improve the ease of use during test and validation of the projection system for end users or factories.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:
1. A projection system, comprising:
a light source module having at least one solid-state light-emitting device;
an image device;
a first light sensor;
a second light sensor; and
a processor communicatively coupled to the light source module, the first light sensor, and the second light sensor, and configured to execute a calibration procedure, wherein the calibration procedure comprises:
driving the at least one solid-state light-emitting device to generate a plurality of output powers according to a plurality of light source control signals, to sequentially emit a plurality of white lights, and to sequentially project a plurality of full white patterns on a screen through the image device;
driving the first light sensor to sequentially sense the plurality of white lights and correspondingly generate a first color information;

driving the second light sensor to sequentially sense the plurality of full white patterns and correspondingly generate a second color information;

obtaining a corresponding relationship between the first color information and the second color information;

obtaining a target color information of the second color information according to a color space coordinate in the second color information;

obtaining a target color information of the first color information according to the target color information of the second color information and the corresponding relationship; and calibrating the light source control signals corresponding to the plurality of output powers according to the target color information of the first color information.

2. The projection system of claim 1, wherein the color space coordinate in the second color information is a color space coordinate of the full white pattern generated by the at least one solid-state light-emitting device with the highest one of the plurality of output powers.

3. The projection system of claim 1, wherein the first color information comprises a plurality of color space coordinates sensed by the first light sensor when the at least one solid-state light-emitting device emits the plurality of white lights with the plurality of output powers.

4. The projection system of claim 1, wherein the second color information comprises a plurality of color space coordinates sensed by the second light sensor when the at least one solid-state light-emitting device projects the plurality of full white patterns with the plurality of output powers.

5. The projection system of claim 1, further comprising an accumulated light box disposed on paths of the plurality of white lights, wherein the accumulated light box has an entrance, the plurality of white lights enter the accumulated light box through the entrance and mix uniformly in the accumulated light box, and the first light sensor is disposed on the accumulated light box.

6. The projection system of claim 5, wherein the accumulated light box further comprises a mirror configured to allow a first part of light of each of the plurality of white lights to pass through and to divert a second part of light of each of the plurality of white lights, the first light sensor is configured to receive one of the first part of light and the second part of light, and the image device is configured to receive another of the first part of light and the second part of light.

7. The projection system of claim 1, further comprising an optical fiber, wherein the light source module and the image device are respectively disposed at two ends of the optical fiber by optical coupling.

8. The projection system of claim 1, further comprising a housing, wherein the light source module and the image device are disposed in the housing, and wherein the image device comprises a light processing module and a projector lens.

9. The projection system of claim 1, wherein the second light sensor is a charge couple device camera or a complementary metal oxide semiconductor.

10. The projection system of claim 1, further comprising:
an input device communicatively coupled to the processor, wherein the input device is configured to receive a calibration input, and the processor is configured to execute the calibration procedure according to the calibration input; and a display device communicatively coupled to the processor and configured to display an execution result of the calibration procedure.

11. A calibration method of a projection system, comprising:

driving at least one solid-state light-emitting device to generate a plurality of output powers according to a plurality of light source control signals, to sequentially emit a plurality of white lights, and to sequentially project a plurality of full white patterns on a screen through an image device;

driving a first light sensor to sequentially sense the plurality of white lights and correspondingly generate a first color information;

driving a second light sensor to sequentially sense the plurality of full white patterns and correspondingly generate a second color information;

obtaining a corresponding relationship between the first color information and the second color information;

obtaining a target color information of the second color information according to a color space coordinate in the second color information;

obtaining a target color information of the first color information according to the target color information of the second color information and the corresponding relationship; and calibrating the light source control signals corresponding to the plurality of output powers according to the target color information of the first color information.

12. The calibration method of a projection system of claim 11, wherein the obtaining the target color information of the second color information according to the color space coordinate in the second color information is according to a color space coordinate of the full white pattern generated by the at least one solid-state light-emitting device with the highest one of the plurality of output powers.

13. The calibration method of a projection system of claim 11, wherein the first color information comprises a plurality of color space coordinates sensed by the first light sensor when the at least one solid-state light-emitting device emits the plurality of white lights with the plurality of output powers.

14. The calibration method of a projection system of claim 11, wherein the second color information comprises a plurality of color space coordinates sensed by the second light sensor when the at least one solid-state light-emitting device projects the plurality of full white patterns with the plurality of output powers.

15. The calibration method of a projection system of claim 11, wherein each of the first color information and the second color information comprise a plurality of color space coordinates.

16. The calibration method of a projection system of claim 11, wherein the corresponding relationship between the first color information and the second color information is a straight-line relationship or an Nth-order polynomial relationship.

17. The calibration method of a projection system of claim 11, wherein the light source control signals comprise a plurality of current signals input to the at least one solid-state light-emitting device.

* * * * *